July 15, 1930. W. C. CHAMBERS 1,770,509
FLEXIBLE METALLIC PACKING
Filed Feb. 23, 1927
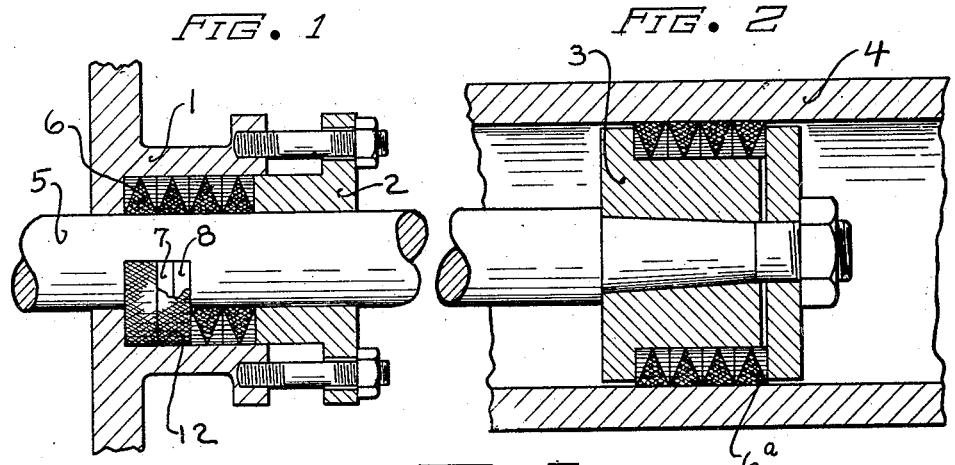
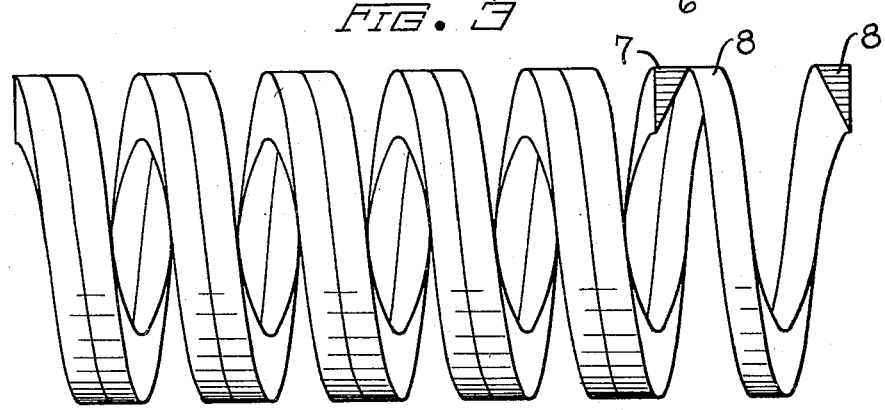
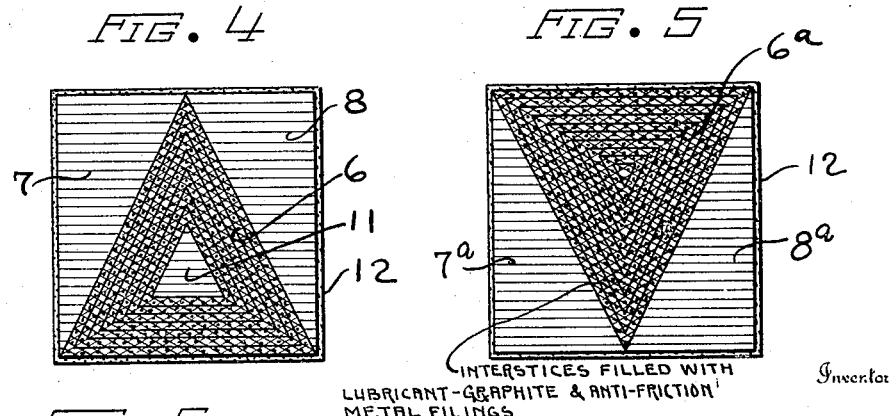
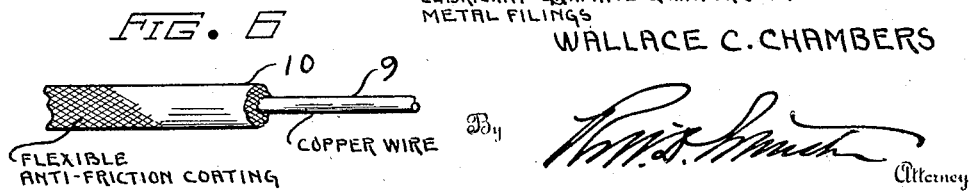
Inventor
WALLACE C. CHAMBERS Patented July 15, 1930

1,770,509

UNITED STATES PATENT OFFICE

WALLACE C. CHAMBERS, OF BIRMINGHAM, ALABAMA

FLEXIBLE METALLIC PACKING

Application filed February 23, 1927. Serial No. 170,355.

My invention relates to a flexible metallic packing characterized by the provision of a braided wearing element formed of wire with a strong flexible inner core and a heavy coat of frictionless material associated with suitable fillers for the interstices in the braided wire body such as high temperature lubricants, anti-friction metal filings, graphite, or other suitable lubricating and anti-friction materials.

Packings of the general character to which my invention relates, have been in use for many years but all with which I am familiar have in use demonstrated certain objectionable characteristics which it is the object of my invention to overcome and the chief of these objectionable characteristics is that the packing, when subjected to the abuse of scored rods, or rods and plungers worn to a reduced diameter, will tend to blow out or creep out in small pieces so that leaking soon results. Some of the packings of the type above referred to have been made of crinkled or crumpled foil; others have been formed of shreds of soft anti-friction metals held together with a braided jacket; and still others have utilized braided lead or soft metal wire associated with graphite and oil fillers; but in no instance with which I am familiar has the packing element proper been formed of braided anti-friction-metal-coated wire having sufficient tensile strength to withstand not only the pressures to which the packing is subjected, but also the action of scored or worn rods. I prefer to utilize copper to form the core of the braided wire in my proposed packing as this metal possesses the necessary tensile strength, high ductility and will be itself suitable as a packing element. It is my purpose to heavily coat such wire with any suitable frictionless metal, and it is preferable that the coat shall be heavy and that the coated wire shall be braided to the shape desired, preferably triangular in cross-section and associated with rubber cushions which will hold it to its work.

A further feature of my invention relates to the rubber cushions which have heretofore been used but which have been molded straight and bent to spiral form. As a result they are under stress which causes them to straighten out and makes it difficult to apply same in the packing space or stuffing box. To overcome this I propose that the cushions shall be molded or shaped in a spiral to conform substantially to the coil pitch of the packing so that the packing will hold its spiral shape and, when assembled in the stuffing box or packing space, will be practically free of stresses except such as are imposed upon it by reason of the compression of the packing axially in the box.

It is a further distinctive feature of my invention that the filler for the braided or woven wire wearing element shall comprise anti-friction metal filings as they will be held much more permanently embodied in the wearing element than where graphite or oil is relied upon exclusively as a lubricating element.

My invention further comprises the novel details of construction as to the manner of forming and filling with lubricants the braided wire bodies, all of which will be more fully understood by reference to the following specification, to the appended claims, and to the accompanying drawings which form a part of this specification, and in which:—

Figs. 1 and 2 show cross-sectional views, partly broken away, of different types of packing according to my invention.

Fig. 3 is a detail view in side elevation of the rubber cushions with which the wearing body is associated, showing the shape in which the latter is molded.

Figs. 4 and 5 are cross-sectional views through two different types of packing embodying my invention.

Fig. 6 is an enlarged detail view of one of the wires from which the wearing body of my packing is braided.

Similar reference numerals refer to similar parts throughout the drawings.

In the embodiment of my invention illustrated, I show the packing in Fig. 1 mounted in a stuffing box and held in place by the packing gland 2 in the usual manner.

In Fig. 2 I show the packing mounted on a piston 3 so as to engage the walls of the cylinder 4. In Fig. 1 the packing works about the piston rod 5 and in Fig. 2 works between the piston and the cylinder in a packing space. The packing element proper is indicated by the reference numeral 6 in Figs. 1 and 4 and is of triangular shape so that it is adapted to be interposed between the spiral cushion segments 7 and 8 which are preferably of rubber or like resilient material which is molded in spiral shape, as shown in Fig. 3, with the spiral set so that the element 6 can be interposed between the cushions and made to conform to the desired spiral and then can be interposed in the stuffing box. The distinctive feature of these cushions is that they are molded or formed so that the material of which they are composed is at rest when they are in a spiral having substantially the diameter of the packing box and having but slight compression to be exerted axially of it to cause the assembled packing to assume its working position.

Where the cushions are used as in Figs. 2 and 5 it will be formed in like manner but the triangular space between the cushions will open outwardly to receive the wearing element 6ª instead of inwardly to receive the wearing element 6.

The wearing elements proper are composed of copper wire 9 which is fine and sufficiently flexible to be braided or woven and which has applied thereto in any suitable manner a heavy anti-friction metal covering 10. An anti-friction metal suitable for this purpose may be composed of lead, antimony, tin and copper, with the lead predominating. Such a covered wire is braided in accordance with the well known practice in the trade so as to assume the triangular shape which adapts it to coact with the cushions. As shown in Fig. 4, I preferably interpose an internal triangular cushion 11 at the center of the braided metal element and braid or weave the wire about this core, but this is optional as will appear by reference to Fig. 5 where the element is formed entirely of the braided wire. The copper wire may be plated with the anti-friction flexible metal as the preferred method of making it and it should be braided or woven in layers either around the triangular core 11 or about the center composed of the same braided or woven material and should be built up to the desired size by braiding or weaving one section over the other, the interstices between the strands and layers of braids being filled with a high temperature lubricant, anti-friction metal filings, and graphite or other suitable lubricant, and anti-friction material. When thus braided and molded to shape the wire element is assembled with its cushions which are preferably of oil proof rubber or other resilient materials and have braided about them a fabric retaining jacket 12 which holds the elements composing the packing assembled in the desired form for marketing and use. To avoid confusion in the drawings wherein it is not practically possible to show the materials used to fill the interstices of the wire element, I have indicated by lettering on the drawing the presence of the selected fillers which are oil, graphite and anti-friction metal filings and which can be applied to the coated copper wire strands prior to or during the braiding operations as may be desired.

In Fig. 5 the cushions are designated 7ª and 8ª and are molded in a spiral with the V-shaped space between them opening outwardly.

While copper is preferred as the wire upon which the anti-friction metal coating shall be applied because of its tensile strength and ductility, and the fact that it is suitable for a packing material, nevertheless it is within the contemplation of my invention that the wearing elements shall be composed of a braided wire having a core or center of relatively high tensile strength carrying a coating of substantial thickness applied in any practicable manner thereto of anti-friction metal to the end that when packing is woven, assembled and mounted in the stuffing box or piston packing space, the wearing element will be composed only of woven or braided material which will not flake or break away easily, but which will possess inherent strength and which will be, as a whole, interwoven and tied together so that the packing will be held in the joint and resist the action of the scored and worn rods which would dislodge it and throw it out.

It is important that the wire strands comprising the wearing element shall pass around the element and be interwoven so as to tie each other, as this arrangement insures against the strands being broken and dragged out of the packing space in small particles. The importance of incorporating the filings of anti-friction metal as a part of the filler for the wearing element lies in the fact that these filings will become embedded in and will be securely held by the wire strands so that they will not tend to work out of the packing as finer lubricating materials will do.

Though I have described with great particularity the details of the embodiment of the invention herein shown, it is not to be construed that I am limited thereto as changes in arrangement and substitution of equivalents may be made by those skilled in the art without departing from the invention as defined in the appended claims.

Having thus described my invention, what I claim as new and desire to secure by Letters Patent, is:—

1. In a flexible metallic packing, a wearing element composed of braided wire strands, each having a fine core of metal of relative high tensile strength coated with a flexible anti-friction metal.

2. In a flexible metallic packing, a wearing element formed of braided wire having a copper core and a thick coating of flexible anti-friction metal, and a lubricant filler for the interstices of the braided wire wearing element.

3. In a flexible metallic packing, an anti-friction flexible metal body made of fine copper wires each heavily coated with frictionless metal and braided in layers to the desired shape in transverse cross section, and a filling for the interstices between the strands and layers comprising lubricating and anti-friction material.

4. A flexible metallic packing consisting of an anti-friction flexible metal body of substantially triangular shape and formed of fine copper wires each heavily coated with a frictionless metal and braided in layers about a triangular shaped center, the interstices between the strands and layers being filled with high temperature lubricant and anti-friction metal filings, two triangular shaped cushion members arranged with the anti-friction metal body to form a rectangular section, and a braided jacket to hold the packing elements assembled.

5. A flexible metallic packing comprising cushion elements associated with a wearing element, a suitable envelope to hold said elements assembled, said wearing element being formed of fine woven wire having a metal core of substantial tensile strength covered with a thick coating of frictionless metal on each strand, the strands being woven to pass around the center of the wearing element, and the interstices of the wearing element being filled with a lubricating material.

In testimony whereof I affix my signature.

WALLACE C. CHAMBERS.